US011328068B1

(12) United States Patent
Niedzwiedz et al.

(10) Patent No.: US 11,328,068 B1
(45) Date of Patent: May 10, 2022

(54) APPLICATION VULNERABILITY RATING SYSTEM

(71) Applicant: Amazon Technologies, Inc., Seattle, WA (US)

(72) Inventors: Christopher Allen Niedzwiedz, Austin, TX (US); James Anil Pramod Kotwal, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 16/703,628

(22) Filed: Dec. 4, 2019

(51) Int. Cl.
*G06F 21/57* (2013.01)
*G06F 21/56* (2013.01)
*H04L 9/08* (2006.01)
*G06F 9/451* (2018.01)
*G06F 21/55* (2013.01)

(52) U.S. Cl.
CPC ............ *G06F 21/577* (2013.01); *G06F 9/451* (2018.02); *G06F 21/552* (2013.01); *G06F 21/564* (2013.01); *G06F 21/566* (2013.01); *H04L 9/0869* (2013.01)

(58) Field of Classification Search
CPC .... G06F 21/577; G06F 21/552; G06F 21/564; G06F 21/566; G06F 9/451; H04L 9/0869; H04L 63/1433
See application file for complete search history.

(56) References Cited

U.S. PATENT DOCUMENTS

| 10,749,890 | B1 * | 8/2020 | Aloisio | G06N 5/003 |
| 2003/0159063 | A1 * | 8/2003 | Apfelbaum | G06F 21/577 726/25 |
| 2017/0366572 | A1 * | 12/2017 | King-Wilson | H04L 63/1433 |
| 2018/0121657 | A1 * | 5/2018 | Hay | G06F 21/577 |
| 2019/0149572 | A1 * | 5/2019 | Gorodissky | H04L 63/1433 726/25 |
| 2020/0167705 | A1 * | 5/2020 | Risoldi | G06N 5/02 |
| 2021/0056211 | A1 * | 2/2021 | Olson | G06N 20/00 |
| 2021/0092143 | A1 * | 3/2021 | Sbandi | G06F 11/3612 |
| 2021/0256623 | A1 * | 8/2021 | Jevtic | G06F 21/552 |

OTHER PUBLICATIONS

Hubbard, et al., "How to Measure Anything in Cybersecurity Risk," 2016, containing 280 pages.
Spring, et al., "Towards Improving CVSS", Software Engineering Institute at Carnegie Mellon University, Dec. 2018, 8 pages.

* cited by examiner

*Primary Examiner* — Thaddeus J Plecha
(74) *Attorney, Agent, or Firm* — Davis Wright Tremaine LLP

(57) ABSTRACT

A method of determining a level of potential risk associated with a potential vulnerability identified in a software application. The method includes generating simulated loss events, determining a plurality of impacts for the simulated loss events, determining the level of potential risk based on the plurality of impacts, and providing a graphical user interface based on the level of potential risk.

20 Claims, 10 Drawing Sheets

400

| STATUS: | SEVERITY: | PRODUCTION: |
|---|---|---|
| NEW | HIGH | IN BETA |

SEVERITY EXPLANATION   402
This vulnerability is of high severity because it has the following potential data impacts.

| CRITICAL |
| ► HIGH |
| MEDIUM |
| LOW |

CONFIDENTIALITY
This vulnerability is estimated to expose 325,000 critical records in the next year.

[graph with y-axis 0.00–1.00] — 404 WHY?
— 414
424

INTEGRITY
This vulnerability is estimated to corrupt 125,000 HC records in the next year.

[graph with y-axis 0.00–1.00] WHY? — 426
— 406
— 416

AVAILABILITY
This vulnerability is estimated to cause 3,000 hours of downtime in the next year.

[graph with y-axis 0.00–1.00] WHY? — 428
— 408
— 418

FIG. 4

Application (1.0)

This is a test app/

Details

Owner: user1
Admin: user2
Read Only users:
Location: Seattle
CTI: Information Security -> Application Security -> Aviator
Dev Status: In Dev
Release to Production: 11-30-2019

Critical/Restricted Data
Data Quantity
[100,000 – 500,000 Recs ▼] — 702

HC Data
Data Quantity
[100,000 – 500,000 Recs ▼] — 704

Confidential Data
Data Quantity
[100,000 – 500,000 Recs ▼] — 706

Public Data
Data Quantity
[100,000 – 500,000 Recs ▼] — 708

APPLICATION VULNERABILITY RATING SYSTEM

BACKGROUND

Mitigating risk attendant a security finding (e.g., a software bug) is a goal of information security ("InfoSec"). The effectiveness of this mitigation hinges on accurate and consistent risk rating. Unfortunately, currently available risk rating systems generate risk scores that are based on inconsistent point-in-time assessments made by the subjective judgement of a human reporter. Further, many existing methods combine subjective ordinal values without mathematical or empirical justifications for doing so.

Thus, currently available risk rating systems provide unreliable risk scores that cause incorrect decisions when triaging, mitigating, and accepting security findings. Further, without accurate visibility to the amount of risk, InfoSec leadership may be unable to identify high impact initiatives. Additionally, application owners may be forced to delay delivering features to their customers without a commensurate reduction in risk.

BRIEF DESCRIPTION OF THE DRAWINGS

Various techniques will be described with reference to the drawings, in which:

FIG. 4 illustrates an example user interface component that displays, to a user, the AVRS score and confidentiality, integrity, and availability impacts used to determine the AVRS score in accordance with an embodiment.

FIG. 7 illustrates an example user interface component that may be used to enter at least some of the application properties in accordance with an embodiment.

DETAILED DESCRIPTION

An Application Vulnerability Rating System ("AVRS") uses statistics, not subjective ratings, to estimate a likelihood of an exploit of a potential software vulnerability as well as the potential impact if such an exploit were to occur. The AVRS does this by obtaining values of vulnerability properties that are related to the potential vulnerability and values of application properties that are related to a software application having the potential vulnerability. These values may be collected automatically by the AVRS, obtained from another system, or entered manually by users and provided to the AVRS. Because these values describe the potential vulnerability and the application, the values are more objective that subjective risk ratings.

The AVRS uses the values of vulnerability properties to select probability distributions and the values of application properties, along with a class of the potential vulnerability, to select impact distributions. The probability and impact distributions may be provided by experts or generated from historical data. The AVRS uses these distributions to perform simulations (e.g., Monte Carlo simulations) that model potential exploits of the potential vulnerability. The results of these simulations are used to generate simulated confidentially, integrity, and availability impacts from which an AVRS score is generated and displayed to users. The AVRS score 100 may be expressed or displayed as a "Low," "Medium," "High," or "Critical" ("LMHC") value to simplify its presentation to users.

Thus, the AVRS provides a statistically driven risk evaluation metric, namely the AVRS score, that may be compared across different potential vulnerabilities and different applications. Additionally, different AVRS scores may be calculated for multiple potential vulnerabilities and aggregated into a total AVRS score. In this manner, users view the potential risks associated with an entire application (or system) and compare those risks across different applications (or systems).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
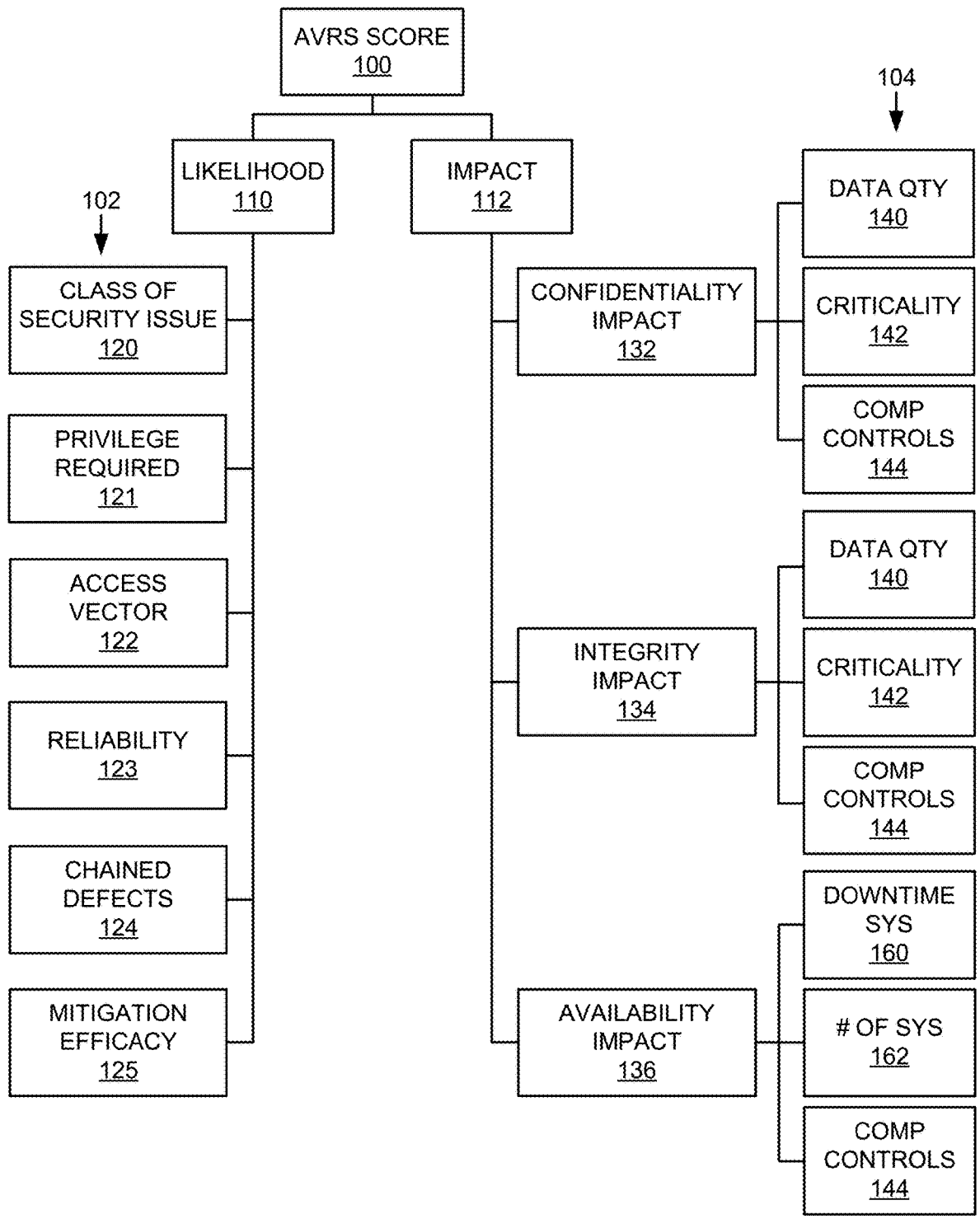
FIG. 1 is a block diagram illustrating components of an AVRS score calculated by an Application Vulnerability Rating System ("AVRS") based on vulnerability and application properties associated with a potential software vulnerability in accordance with an embodiment.
Figure 2:
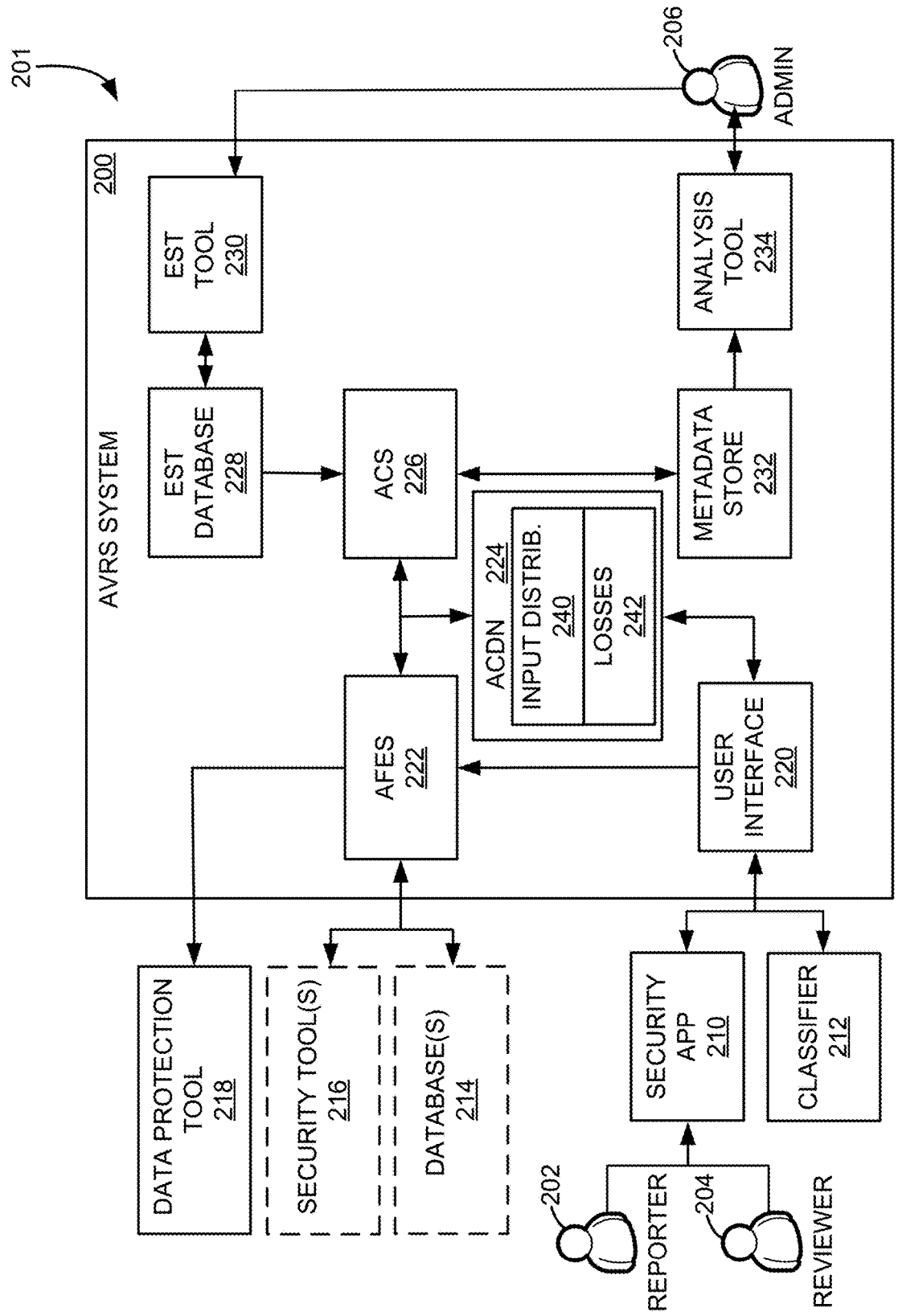
FIG. 2 is a block diagram of an example system in which the AVRS may operate in accordance with an embodiment.

FIG. 1 is a block diagram illustrating an AVRS score 100 calculated for a particular potential vulnerability by an AVRS 200 illustrated in FIG. 2. Returning to FIG. 1, the AVRS score 100 is a transparent, data-driven, and comprehensible metric that rates those risks attendant software security findings (e.g., software bugs), referred to as potential vulnerabilities. While the term "potential vulnerability" will be used to refer to such software security findings, it is to be understood that a "potential vulnerability" does not necessarily make an application or system vulnerable. Instead, a potential vulnerability merely represents a potential security issue that may exist.

The AVRS score 100 is based on an estimate of an expected loss that could potentially be caused by a particular potential vulnerability within a predetermined amount of time (e., within the next year). The AVRS score 100 may be expressed or displayed as a "Low," "Medium," "High," or "Critical" ("LMHC") value to simplify its presentation. The AVRS score 100 provides development teams with a consistent, data-driven view of which potential vulnerabilities are most in need of mitigation without those teams needing of a security background to understand the AVRS score 100. In other words, the AVRS score 100 enables data-driven decisions about potential vulnerabilities.

The AVRS score 100 is calculated based on likelihood 110 and an impact 112. The likelihood 110 is calculated for the particular potential vulnerability based on vulnerability properties 102. The likelihood 110 is an estimate of a probability of a loss event occurring within the predetermined amount of time (e.g., one year). For example, the likelihood 110 may be the probability of the particular potential vulnerability being exploited within one year.

The vulnerability properties 102 are properties of the particular potential vulnerability. In the example illustrated in FIG. 1, the vulnerability properties 102 include a vulnerability class 120, a required privilege 121, an access vector 122, a reliability metric 123, chained defect(s) 124, and a mitigation efficacy 125. Values of the vulnerability properties 102 may be entered manually by a reporter 202 (see FIG. 2), provided automatically by optional security tool(s) 216 (see FIG. 2), and/or provided by existing security application(s) 210 (see FIG. 2), such as Anvil.

The impact 112 is calculated for the particular potential vulnerability based on a confidentially impact 132, an integrity impact 134, and an availability impact 136. Each of the confidentially, integrity, and availability impacts 132, 134, and 136 is calculated based on application properties 104 and the value of the vulnerability class 120 for the particular potential vulnerability.

The application properties 104 are properties of an application having the particular potential vulnerability. The application properties 104 include information about data handled by the application, network exposure, and other application metadata. In the example illustrated, the confidentially impact 132 is calculated based on the following three application properties: an amount of data 140 potentially impacted; criticality 142 of data handled by the application; and compensating control(s) 144 available to the application. The integrity impact 134 may be calculated based on the same three application properties as the confidentially impact 132, namely, the amount of data 140 potentially impacted, the criticality 142 of the data handled by the application, and the compensating control(s) 144. The availability impact 136 is calculated based on the following three application properties: a projected amount of downtime per system potentially impacted 160, a number of systems potentially impacted 162, and the compensating control(s) 144.

Thus, to calculate the AVRS score 100, at most, the reporter 202 (see FIG. 2) must provide only information about the potential vulnerability and the application with the potential vulnerability. The likelihood 110 and the confidentially, integrity, and availability impacts 132, 134, and 136 are determined based on probability distributions (described below) that are generated from input provided by security experts and/or historical data. In this manner, the AVRS score 100 removes inconsistent guesswork that occurs when human reporters are asked to gauge the likelihood of a potential vulnerability being exploited.

FIG. 2 is a block diagram of an example system 201 in which the AVRS 200 may operate. The AVRS 200 may be operated by human users, such as the reporter 202, a reviewer 204, and an administrator 206. The AVRS 200 may be configured to interface with the existing security application(s) 210, a vulnerability classifier 212, optional database(s) 214, the optional security tool(s) 216, and a data protection tool 218. The AVRS 200 includes a user interface 220, an AVRS front end service ("AFES") 222, an AVRS Content Delivery Network ("ACDN") 224, a AVRS Calculation Service ("ACS") 226, an estimate database 228, an estimate tool 230, a metadata store 232, and an analysis tool 234.

The existing security application(s) 210 may be implemented as any security application and/or risk scoring software configured to collect any of the vulnerability properties 102 (see FIG. 1) and/or the application properties 104 (see FIG. 1). By way of non-limiting examples, the existing security application(s) 210 may be Anvil, Shepard, and the like. By way of another non-limiting example, the existing security application(s) 210 may include a data governance system (e.g., within an organization) configured to store those of the application properties 104 (see FIG. 1) related to quantity and type of data. The application properties 104 (see FIG. 1) may be obtained from the existing security application(s) 210. For example, the reporter 202 and/or the reviewer 204 may input one or more of the application properties 104 into the existing security application(s) 210, which may be configured to provide any such information directly to the AFES 222. Alternatively, the existing security application(s) 210 may be configured to generate all or portions of the user interface 220, which is configured to provide information manually entered by the reporter 202 directly to the AFES 222.

The vulnerability classifier 212 is an application or service configured to automatically classify a potential vulnerability and provide the value of the vulnerability class 120 directly to the AFES 222. By way of a non-limiting example, the vulnerability classifier 212 may be implemented using a text classifier referencing an industry standard classification set, such as Common Weakness Enumeration list provided by The MITRE Corporation.

The optional database(s) 214 are each an application or service configured to store data and manage that data in memory. The optional database(s) 214 store vulnerability and application metadata including at least some of the vulnerability properties 102 (see FIG. 1) and/or the application properties 104 (see FIG. 1). The optional database(s) 214 may be part of the existing security application(s) 210 or created and maintained by another application. Alternatively, the optional database(s) 214 may be maintained by the AFES 222 and/or the ACDN 224.

The optional security tool(s) 216 are each an application or service configured to scan an application and/or system and automatically identify a vulnerably and its vulnerability properties 102 (see FIG. 1). The optional security tool(s) 216 may be implemented using one or more InfoSec automation tools, such as static code analyzers, vulnerability scanners, and the like. Non-limiting examples of static code analyzers include Fortify, Coverity, and the like. Non-limiting examples of vulnerability scanners include Qualys, Nexpose, and the like. One or more of the optional security tool(s) 216 may be configured to scan an application and/or system and automatically identify its application properties 104 (see FIG. 1). Information obtained by the optional security tool(s) 216 may be provided to the directly to the AFES 222 and/or stored in the optional database(s) 214 and used to auto-populate and/or update the application properties 104. For example, the amount of data 140 (see FIG. 1) and/or the criticality 142 (see FIG. 1) of the data handled by the application may be collected automatically by the optional security tool(s) 216 and provided to the AFES 222.

The data protection tool 218 is an application or service configured to receive an instruction from the AFES 222 and, in response to that instruction, take an action with respect the application having the particular potential vulnerability. The AFES 222 may provide the instruction when the AVRS score 100 (see FIG. 1) and/or one of the confidentially, integrity, and availability impacts 132, 134, and 136 exceeds a threshold value. Different threshold values may be used depending upon various factors, such as sensitivity of the data handled by the application, customer requirements, and the like. The action is configured to prevent the application with the particular potential vulnerability from causing harm to the system 201. For example, the action may protect data, the application, and other systems from the potential vulnerability by, for example, preventing the application from accessing user data, preventing the application from going into production, quarantining the application, and the like.

Figure 5:
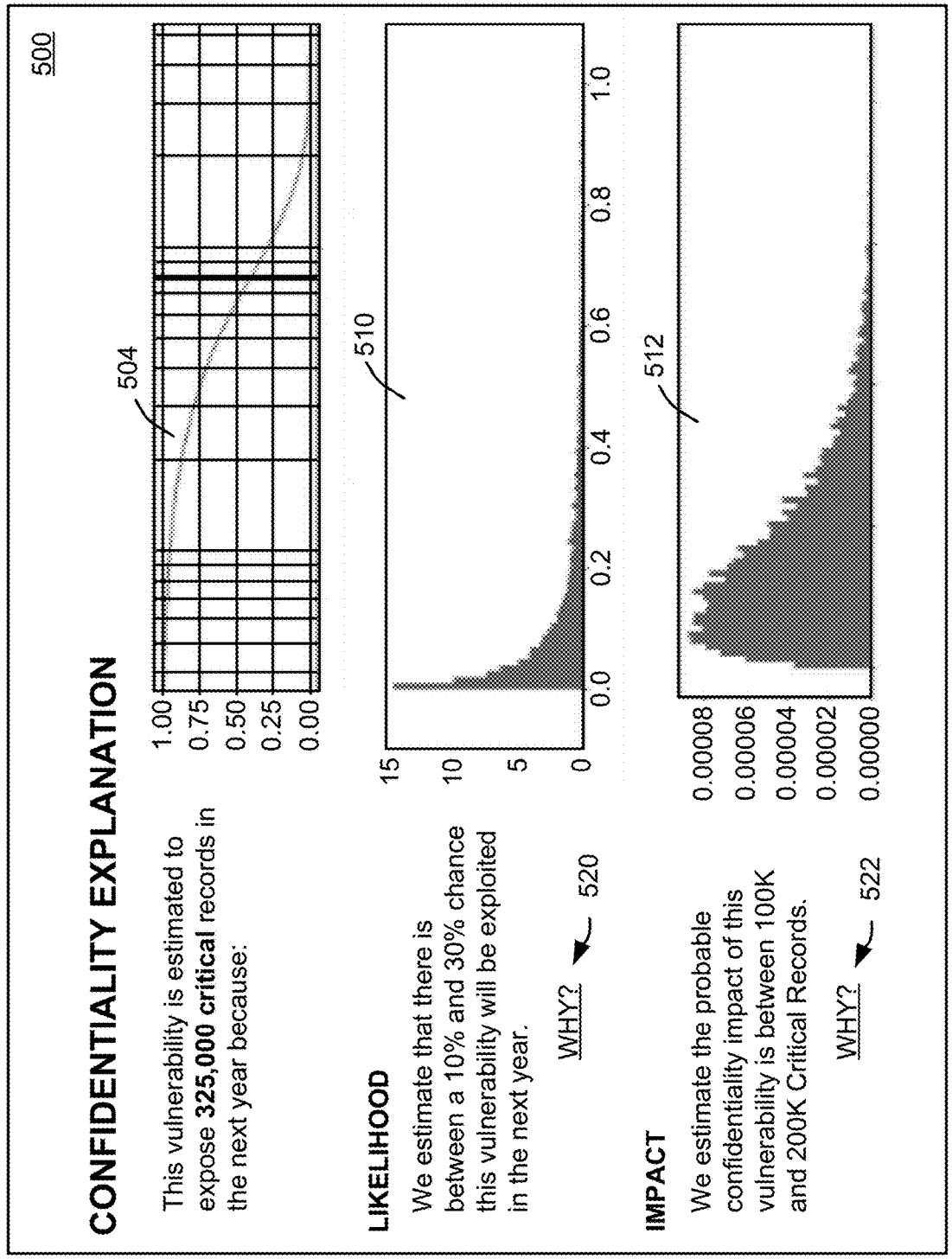
FIG. 5 illustrates an example user interface component that displays an explanation of the confidentiality impact of FIG. 4, which includes a graph depicting a likelihood of the potential vulnerability being exploited and a graph depicting an impact distribution used to determine the confidentiality impact in accordance with an embodiment.
Figure 6:
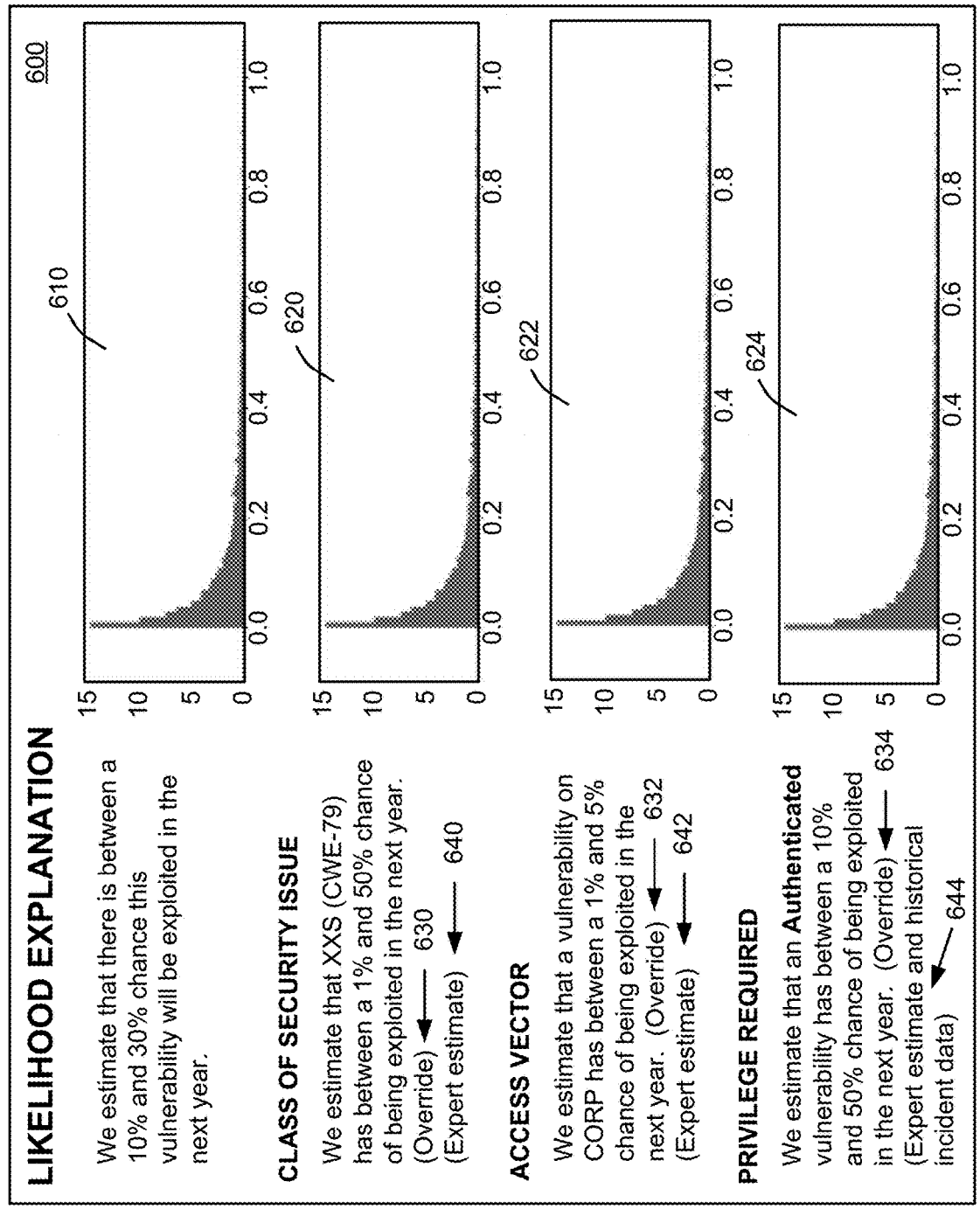
FIG. 6 illustrates an example user interface component that displays an explanation of the likelihood of FIG. 5, which includes graphs depicting three conditional probabilities that contributed to the likelihood in accordance with an embodiment.
Figure 8:
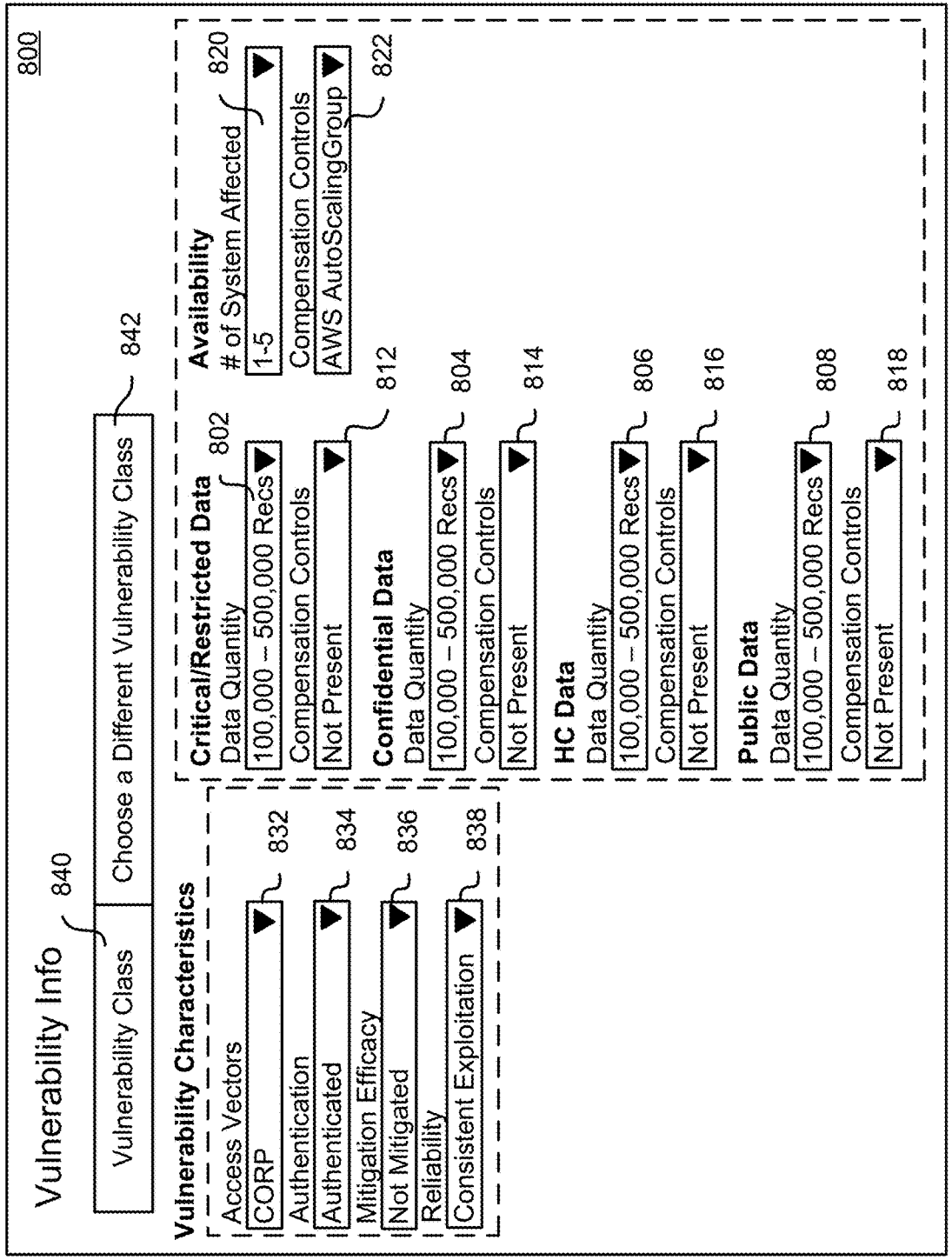
FIG. 8 illustrates an example user interface component that may be used to enter at least some values some of the application properties and at least some of the vulnerability properties in accordance with an embodiment.
Figure 9:
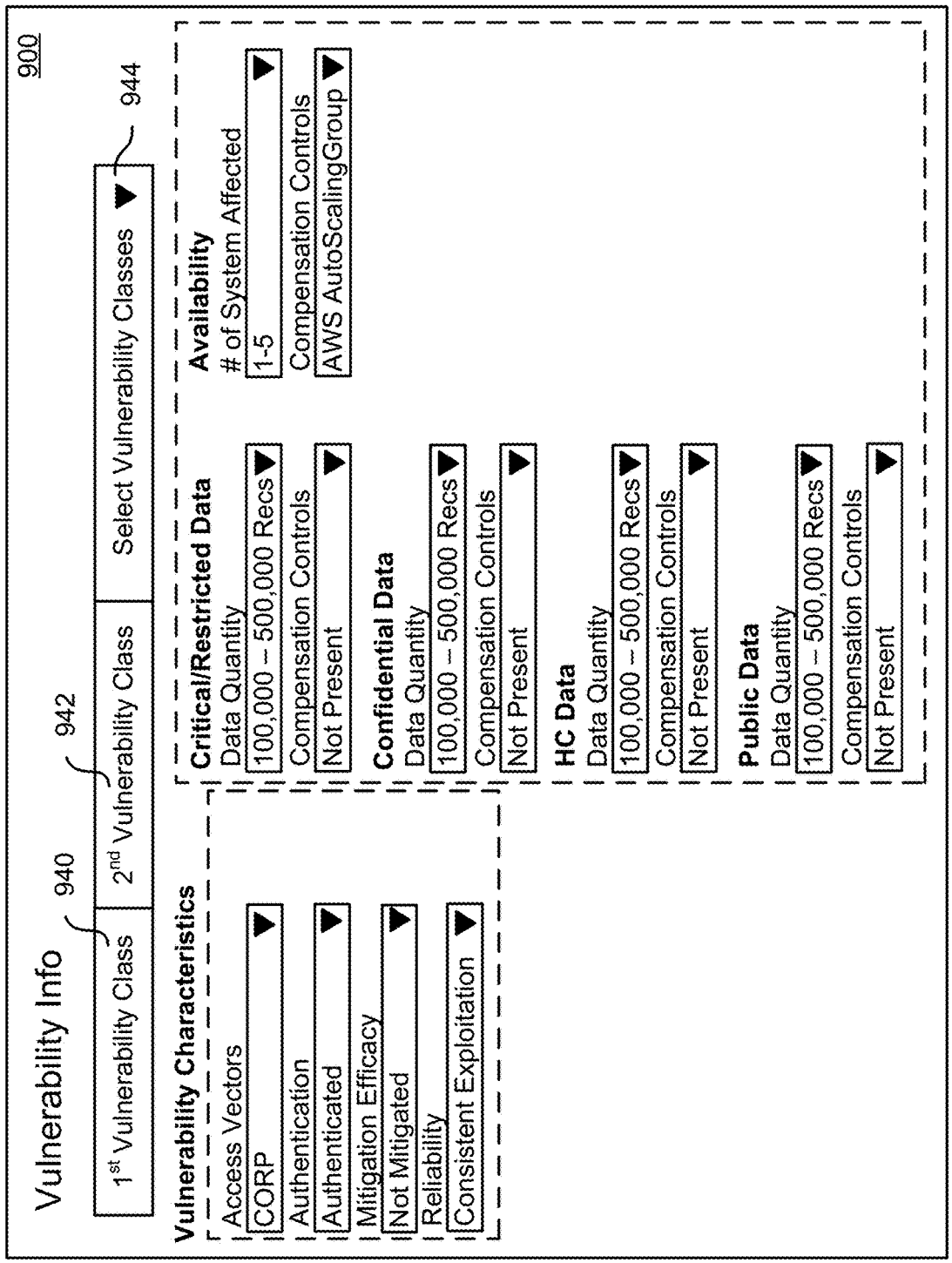
FIG. 9 illustrates an example user interface component that may be used to enter to enter multiple vulnerability classes for a particular vulnerability in accordance with an embodiment.

The user interface 220 is a series of web pages, screens, or similar visual displays. The user interface 220 may be characterized as including both data input components and output display components. The data input components are used to collect application and vulnerability metadata as well as input overrides. FIGS. 7-9 illustrate example data input components. The output display components display the AVRS score 100 (see FIG. 1) to a user, such as the reviewer 204. FIGS. 4-6 illustrate example output display components. The user interface 220 is configured to send a request or query to the ACS 226 (via the AFES 222) requesting that the ACS 226 determine the AVRS score 100 (see FIG. 1) for a particular potential vulnerability. The ACS 226 determines the AVRS score 100 and forwards it to the AFES 222, which forwards the AVRS score 100 to the user interface 220 for display to the user.

The AFES 222 is an application or service that hosts an application programming interface ("API") that other applications may invoke to store metadata and get the AVRS score 100 (see FIG. 1). For example, the user interface 220 calls the API of the AFES 222 to store input overrides and get the AVRS score 100 (see FIG. 1). When receiving metadata, the AFES 222 stores the metadata (e.g., in the metadata store 232 or other database). When new metadata arrives, the AFES 222 builds a scoring request and sends it to the ACS 226, which calculates the AVRS score 100 and sends it to the AFES 222. The AFES 222 provides all of the data needed by the ACS 226 to perform the calculations. The AFES 222 stores any input overrides (e.g., in the estimate database 228 or another override database) and provides the input overrides to the ACS 226 along with any expert estimates for any values that have not been overridden. The AFES 222 plots distributions for all the input overrides, historical data, and expert estimates and stores those distributions, as input distributions 240, in the ACDN 224.

The ACDN 224 is an application or service configured to store the input distributions 240, intermediate calculation distributions, the likelihood 110 (see FIG. 1), the impact 112 (see FIG. 1), and expected losses 242. Referring to FIG. 1, the input distributions 240 (see FIG. 2) include (a) a different probability distribution for each value of each of the vulnerability properties 102, (b) a different distribution for each of the confidentially, integrity, and availability impacts 132, 134, and 136 for each unique value of the vulnerability class 120, (c) a probability distribution indicating a likelihood of the likelihood of a loss event occurring, and (d) a distribution for each of the compensating control(s) 144.

The input distributions 240 may be determined based on expert estimates and/or historical data. For example, a group of calibrated experts may be used to develop one or more of the input distributions 240 if there is insufficient historical data to develop the input distribution(s). Calibration is a process by which an individual learns how to correctly estimate a range of possible values of an unknown. The estimate database 228 stores all expert estimates and distributions obtained from those expert estimates. Experts may estimate minimum and maximum values of a range of possible values for a particular input distribution, as well as an optional expected value. The estimate tool 230 may be used to enter these estimates into the estimate database 228. The estimate database 228 stores these raw values so the ACS 226 may use them for reference. The estimate tool 230 uses these raw values to calculate parameters of a Beta distribution or other distribution. Any such pre-calculated distributions are then saved (as one or more of the input distributions 240) for use by the ACS 226 when it performs the scoring calculation.

The ACS 226 is an application or service that may present an application programming interface ("API") or similar interface to other services, including the existing security application(s) 210, that such services may use to store collected metadata and obtain AVRS scores. The ACS 226 calculates the AVRS score 100 (see FIG. 1) based on data provided by the AFES 222, the metadata store 232, and/or the estimate database 228. As mentioned above, the user interface 220 may query the ACS 226 (as a backend service), which persists the application properties 104 and performs calculations (e.g., in batch and on demand). The reporter 202 may use on demand calculations to immediately determine the AVRS score 100 (see FIG. 1) for newly discovered potential vulnerabilities.

The ACS 226 receives all inputs needed for a given calculation from the AFES 222, calculates a result, and sends the result back to the AFES 222. Referring to FIG. 1, the result includes the AVRS score 100, the likelihood 110, the impact 112, the confidentially impact 132, the integrity impact 134, the availability impact 136, and/or the expected losses 242 (see FIG. 2). Referring to FIG. 2, the ACS 226 provides the result to the user interface 220 (via the AFES 222) so a user (e.g., the reporter 202, the reviewer 204, and the like) can see visually how the AVRS 200 arrived at the AVRS score 100. The ACS 226 generates static images during the calculation and stores them in the ACDN 224. The ACDN 224 may also store values displayed (e.g., plotted) in the user interface 220.

The estimate tool 230 is an application or service configured to be used by an expert to input probability estimates for the vulnerability properties 102. Thus, the estimate tool 230 may be used to input the probability distributions and/or values used to generate the probability distributions. The estimate tool 230 may store a set of calibration questions, randomly selects questions for calibration exercises, and scores a user's responses to the calibration questions. The estimate tool 230 also supports adding new questions, removing existing questions, as well as modifying questions.

The analysis tool 234 is an application or service configured to improve the AVRS score 100 over time by identifying problems and tuning probability values. The analysis tool 234 may generate a user interface that allows users (e.g., engineers) to inspect the input distributions 240 as well as how they were derived. The analysis tool 234 may also surface commonly overridden inputs and provide a recommended new estimate derived from these user overrides.

Figure 3:
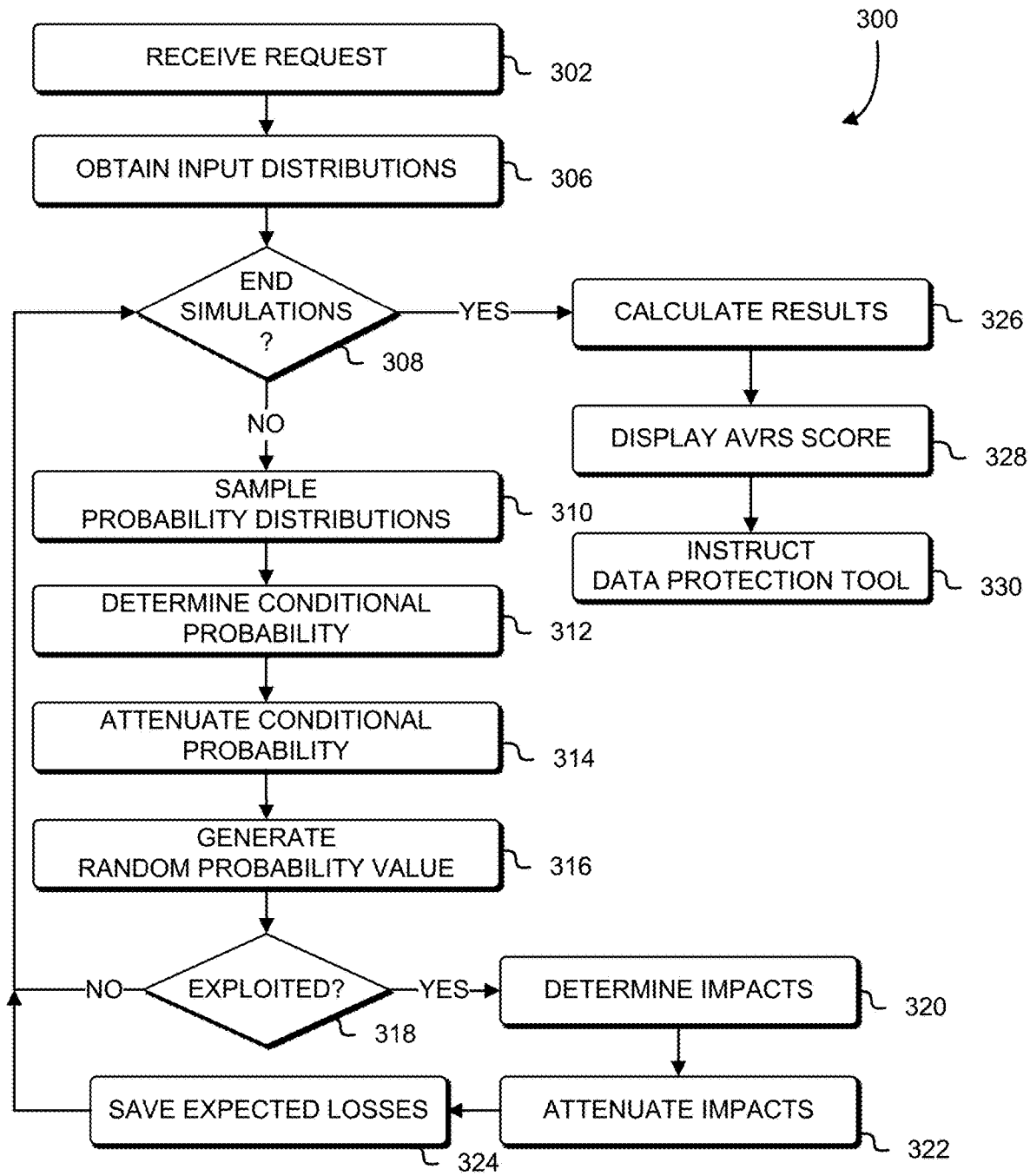
FIG. 3 is flow diagram of a method of calculating the AVRS score performed by an AVRS Calculation Service of the AVRS in accordance with an embodiment.

FIG. 3 is flow diagram of a method 300 performed by the AVRS 200 (see FIG. 2) when the AVRS 200 calculates the AVRS score 100 (see FIG. 1). Pseudocode provided below is an example implementation of a portion of the method 300. As mentioned above, the system 201 (see FIG. 2) stores potential vulnerabilities each associated with an application.

Each of these potential vulnerabilities is associated with a vulnerability identifier and each of the applications is associated with an application identifier. Before the method 300 begins, a user (e.g., the reporter 202, the reviewer 204, and the like) may use the user interface 220 to select a potential vulnerability that is associated with an application having the selected potential vulnerability. The user interface 220 communicates the vulnerability identifier associated with the selected potential vulnerability to the AFES 222, which formulates and forwards a request to the ACS 226. The request includes the information needed to calculate the AVRS score 100 for the selected potential vulnerability. Alternatively, the AFES 222 may automatically generate the request without having first received a communication from the user interface 220 and provide the request to the ACS 226.

In first block 302, the ACS 226 receives the request. The request includes the vulnerability identifier, the vulnerability properties 102 (see FIG. 1), and the application properties 104 (see FIG. 1). If the request does not include the application identifier, the ACS 226 may look up or use the API of the AFES 222 to look up the selected potential vulnerability in the appropriate database or store (e.g., the metadata store 232) and obtain the application identifier associated with the selected potential vulnerability.

Then, in block 306, the ACS 226 obtains relevant ones of the input distributions 240. The input distributions 240 may have been included in the request by the AFES 222. Alternatively, the ACS 226 may request them from the ACDN 224. In block 306, the ACS 226 obtains the following seven distributions:

a probability distribution P(Le) of the likelihood of a loss event occurring;

a probability distribution P(Vc) of the likelihood of the value indicted by the vulnerability class 120;

a probability distribution P(Au) of the likelihood of the value indicted by the required privilege 121;

a probability distribution P(Av) of the likelihood of the value indicted by the access vector 122;

a probability distribution P(Ch) of the likelihood of the value(s) indicted by the chained defect(s) 124;

a probability distribution P(R) of the likelihood an exploit will success on a first try given the value indicted by the reliability metric 123; and a probability distribution P(Me) of the likelihood mitigation fails given the value indicted by the mitigation efficacy 125.

In the pseudocode below, the probability distributions P(Le), P(Vc), P(Au), P(Av), P(Ch), P(R), and P(Me) are represented by variables "dLe," "dVc," "dAu," "dAv," "dCh," "dR," and "dMe," respectively.

In block 306, the ACS 226 also obtains a distribution from the ACDN 224 for each of the confidentially, integrity, and availability impacts 132, 134, and 136 for the values of the application properties 104 and the value indicted by the vulnerability class 120. Thus, the ACS 226 obtains the following three distributions: $I_c(Vc)$, $I_i(Vc)$, and $I_a(Vc)$.

The distribution $I_c(Vc)$ is a distribution of confidentiality impacts experienced when a potential vulnerability having the vulnerability class indicated by the value of the vulnerability class 120 is exploited. The distribution $I_c(Vc)$ models an amount of customer and/or business data that may potentially be exposed in a successful attack on a potential vulnerability of that vulnerability class. In the pseudocode, the distribution $I_c(Vc)$ is represented by a variable "dIc."

The distribution $I_i(Vc)$ is a distribution of integrity impacts experienced when a potential vulnerability of the vulnerability class indicated by the value of the vulnerability class 120 is exploited. The distribution $I_i(Vc)$ models an amount of customer and/or business data that may potentially be altered in a successful attack on a potential vulnerability of that vulnerability class. In the pseudocode, the distribution $I_i(Vc)$ is represented by a variable "dIi."

The distribution $I_a(Vc)$ is a distribution of availability impacts experienced when a potential vulnerability of the vulnerability class indicated by the value of the vulnerability class 120 is exploited. The distribution $I_a(Vc)$ models an amount of downtime that may potentially occur in a successful attack on a potential vulnerability of that vulnerability class. In the pseudocode, the distribution $I_a(Vc)$ is represented by a variable "dIa."

Additionally, in block 306, the ACS 226 obtains a distribution "dCc" for the compensating control(s) 144. Compensating controls are those that do not mitigate the potential vulnerability itself, but instead attenuate the possible impacts. For example, if there is an attack on the permissions of a system that attackers are using to exfiltrate data, auditing alarms can limit the impact of the attack by alerting a team to the odd behavior and giving them the opportunity to react and reduce the amount of stolen data. Thus, in this example, the auditing alarms are compensating controls. By way of a non-limiting example, the compensating controls may include one or more of the following: log auditing, data retention limits, alerts, behavior monitoring, network isolation, authentication (for those vulnerability classes that are non-authn), authorization (for those vulnerability classes that are non-authz), and encryption (for non-confidentiality vulnerability classes). The term "non-authn" means the user must be authenticated or identified to access the system. The term "non-authz" means the user must be authorized or have permission to access the system.

Next, the ACS 226 executes a number (e.g., 10,000) of simulations. In the pseudocode below, the ACS 226 performs 10,000 Monte Carlo simulations. In decision block 308, the ACS 226 determines whether the last simulation has been performed and the ACS 226 should end the simulations. The decision in decision block 308 is "YES," when the last simulation has been performed. Otherwise, the decision in decision block 308 is "NO." When the decision in decision block 308 is "YES," the ACS 226 advances to block 326. On the other hand, when the decision in decision block 308 is "NO," the ACS 226 advances to block 310.

In block 310, the ACS 226 samples the probability distributions P(Le), P(Vc), P(Au), P(Av), and P(Ch), to obtain sample values PLe, PVc, PAu, PAv, and PCh, respectively. The ACS 226 also samples the probability distribution P(R) to obtain a sample value R and the probability distribution P(R) to obtain a sample value Me.

Then, in block 312, the ACS 226 determines a conditional probability "P" using an Equation 1 below.

$$P=P(Le|Vc,Av,Au,Ch) \qquad \text{Equation 1}$$

In the pseudocode below, the ACS 226 calculates the conditional probability "P" by calling a function "get_conditional_probability" and passing the sample values PLe, PVc, PAu, PAv, and PCh to the function "get_conditional_probability." The function "get_conditional_probability" performs a Log Odds Ratio ("LOR") technique described below to determine the conditional probability "P."

The large set of conditions, those values after the "|" in the Equation 1, require calculation with all values for all components. This would require at least 200*3*2*200=240,000 different calculations if there are 200 vulnerability classes, three access vectors, two authentication methods, and 200 chained vulnerability classes. The ACS 226 (see FIG. 2) reduces the number of estimates by decomposing the conditional probabilities into four individual components. In other words, the ACS 226 (see FIG. 2) estimates only the following conditional probabilities: P(Le|Vc), P(Le|Au), P(Le|Av), and P(Le|Ch). Continuing the previous example, this requires estimates for only about 405 different values (200+3+2+200=405), which is more manageable.

The conditional probability P(Le|Vc) is a probability of a loss event occurring given the vulnerability class indicated by the value of the vulnerability class 120 within a predetermined amount of time (e.g., one year). In other words, the conditional probability P(Le|Vc) is the probability of a potential vulnerability of the vulnerability class identified being exploited within the predetermined amount of time.

The conditional probability P(Le|Au) is a probability of a loss event occurring given the required authentication and/or authorization indicated by the value of the required privilege 121 within the predetermined amount of time (e.g., one year). In other words, the conditional probability P(Le|Au) is the probability of a potential vulnerability that requires this authentication and/or authorization being exploited within the predetermined amount of time.

The conditional probability P(Le|Av) is a probability of a loss event occurring given the value of the access vector 122 within the predetermined amount of time (e.g., one year). In other words, the conditional probability P(Le|Av) is the probability of a potential vulnerability that requires the access vector being exploited within the predetermined amount of time.

The conditional probability P(Le|Ch) is a probability of a loss event occurring given additional historical chained defects indicated by the value of the chained defect(s) 124 within the predetermined amount of time (e.g., one year). In other words, the conditional probability P(Le|Ch) is the probability of a potential vulnerability that has the same (upstream and/or downstream) chained defects being exploited within the predetermined amount of time.

These decomposed conditional probabilities can be combined using the LOR technique, whereby each condition is evaluated independently. The LOR is calculated using Equation 2:

$$LOR(P(x)) = \ln\left(\frac{P(x)}{1-P(x)}\right) \quad \text{Equation 2}$$

Then, for each condition Ci in P(X|C0 ... Ci), Equation 3 is used:

$$LOR(P(X|C_0 \ldots C_n)) = \Sigma_{i=0}^n LOR(P(X|C_i)) - LOR(P(X)) \quad \text{Equation 3}$$

Next, the conditional probability itself is obtained using Equation 4:

$$P(X|C_0 \ldots C_n) = \frac{1}{\left(1 + \frac{1}{e^{LOR(P(X|C_0 \ldots C_n)) + LOR(P(X))}}\right)} \quad \text{Equation 4}$$

The sample value R is a probability of a loss event occurring on a first attempt. In other words, the sample value R indicates whether an exploit works every time or whether there is something inherent to the system that requires some number of tries before exploit is successful. For example, the sample value R may be set to one when the exploit works every time.

The sample value Me is a probability a mitigation (indicated by the mitigation efficacy 125) applied to the vulnerability class and fails to prevent exploitation. In other words, the sample value Me is a measure of the effectiveness of the mitigation.

In block 314, the ACS 226 calculates a probability "Patt" by attenuating the conditional probability "P" based on the sample values R and Me using the Equation 5:

$$Patt = P * R * (1 - Me) \quad \text{Equation 5}$$

Thus, the likelihood of exploitation may be expressed by Equation 6:

$$P(Le|Vc,Au,Av,Ch,R,Me) \quad \text{Equation 6}$$

Next, in block 316, the ACS 226 generates a random probability value.

In decision block 318, the ACS 226 compares the random probability value to the probability "Patt" to determine whether the potential vulnerability is exploited during the present round of simulation. For example, if the random probability value is less than the probability "Patt," the ACS 226 determines the potential vulnerability is exploited and the decision in decision block 318 is "YES." Otherwise, the ACS 226 determines the potential vulnerability is not exploited and the decision in decision block 318 is "NO." When the decision in decision block 318 is "NO," the ACS 226 returns to decision block 308. On the other hand, when the decision in decision block 318 is "YES," the ACS 226 advances to block 320.

In block 320, the ACS 226 determines the impacts of the potential vulnerability having been exploited. Thus, the ACS 226 samples the distributions "dIc," "dIi," and "dIa" to obtain samples that include a confidentially impact "Ic," an integrity impact "Ii," and an availability impact "Ia," respectively.

Then, in block 322, the ACS 226 determines a total attenuation value for each of the impacts "Ic," "Ii," and "Ia" based on the compensating control(s) 144 (see FIG. 1) and applies the respective total attenuation value to each of the impacts "Ic," "Ii," and "Ia." In pseudocode below, the ACS 226 samples the distribution "dCc" for each of the values of the compensating control(s) 144 to obtain sample values "Ccs." Then, the ACS 226 obtains an array "total_attentuation" of conditional probabilities for the sample values "Ccs." In the pseudocode, the function "get_conditional_probability" is called and passed the sample values "Ccs" to obtain the conditional probabilities stored in the array "total_attentuation." The array "total_attentuation" stores the total attenuation values which include a separate value for each of the impacts "Ic," "Ii," and "Ia." Then, the ACS 226 may apply the total attenuation values by multiplying each of the impacts "Ic," "Ii," and "Ia" by its respective total attenuation value to obtain attenuated impacts "Icatt," "Iiatt," and "Iaatt," respectively.

In block 324, the ACS 226 stores the attenuated impacts "Icatt," "Iiatt," and "Iaatt" and/or un-attenuated impacts "Ic," "Ii," and "Ia" as the expected losses 242 (see FIG. 2). In the pseudocode below, the ACS 226 appends the attenuated impacts "Icatt," "Iiatt," and "Iaatt" to a data structure "expected_losses." The attenuated confidentially impact "Icatt" is the confidentially impact 132 (see FIG. 1), the attenuated integrity impact "Iiatt" is the integrity impact 134 (see FIG. 1), and the attenuated availability impact "Iaatt" is the availability impact 136 (see FIG. 1) obtained for the present simulation. Then, the ACS 226 returns to decision block 308. Thus, the ACS 226 simulates a number of loss events and, for those loss events in which a loss occurred, stores the confidentially, integrity, and availability impacts 132, 134, and 136 in data structure "expected_losses."

In block 326, the ACS 226 calculates the results and sends them to the AFES 222 (see FIG. 2). In block 326, the ACS 226 may calculate the impact 112 by calculating confidentially, integrity, and availability metrics (e.g., the top $90^{th}$ percentile) from the confidentially, integrity, and availability impacts 132, 134, and 136 (or the attenuated impacts "Icatt," "Iiatt," and "Iaatt") obtained for all of the simulations. While not shown in the pseudocode, in block 326, the ACS 226 calculates the AVRS score 100 from the impact 112. For example, the ACS 226 may calculate the AVRS score 100 by thresholding the confidentially, integrity, and availability metrics of the impact 112 to obtain a LMHC value. In this example, the AVRS score 100 is the LMHC value.

Next, in block 328, the AVRS 200 displays the AVRS score 100. FIGS. 4-6 illustrate example user interfaces (e.g., windows or screens) that present the AVRS score 100 and explanations of the AVRS score 100 to the user. Referring to FIG. 4, the AFES 222 (see FIG. 2) uses the results to generate a window, screen, or page 400 of the user interface 220 (see FIG. 2). The page 400 includes a graphical display 402 depicting the AVRS score 100 (see FIG. 1) as one of the LMHC values, which in the example illustrated in FIG. 4 is "High." Thus, in FIG. 4, the confidentially, integrity, and availability metrics of the impact 112 (see FIG. 1) have been thresholded into one of the LMHC bins based on a set of criteria. The page 400 also includes graphs 404, 406, and 408 of the confidentially, integrity, and availability impacts 132, 134, and 136, respectively, obtained for all of the simulations. In the graphs 404, 406, and 408, bold lines 414, 416, and 418, respectively, depict the confidentially, integrity, and availability metrics of the impact 112 (e.g., the top $90^{th}$ percentile) obtained for the confidentially, integrity, and availability impacts 132, 134, and 136, respectively.

Next to the graphs 404, 406, and 408, the page 400 includes user selectable inputs 424, 426, and 428, respectively. When selected (e.g., clicked on), the user selectable inputs 424, 426, and 428 cause the user interface 220 (see FIG. 2) to display information explaining the results depicted in the graphs 404, 406, and 408, respectively.

For example, when the user selects the user selectable input 424, a page 500 (see FIG. 5) may be displayed. Referring to FIG. 5, the page 500 displays information explaining the results depicted in the confidentially graph 404 (see FIG. 4), which is reproduced in FIG. 5 as a graph 504. The page 500 includes a graph 510 depicting the probability "P" or the probability "Patt" obtained for the simulations and a graph 512 depicting the distribution $I_c(Vc)$ obtained for the simulations. Next to the graphs 510 and 512, the page 500 includes user selectable inputs 520 and 522, respectively. When selected (e.g., clicked on), the user selectable inputs 520 and 522 cause the user interface 220 (see FIG. 2) to display information explaining the results depicted in the graphs 510 and 512, respectively.

For example, when the user selects the user selectable input 520, a page 600 (see FIG. 6) may be displayed. Referring to FIG. 6, the page 600 displays information explaining the results depicted in the graph 510 (see FIG. 5), which is reproduced in FIG. 6 as a graph 610. The page 600 includes graphs 620, 622, and 624 depicting the conditional probabilities P(Le|Vc), P(Le|Av), and P(Le|Au), respectively, determined for the simulations.

Thus, the user interface 220 allows users to click for more information and view the input distributions that lead to the AVRS score 100.

Next to the graphs 620, 622, and 624, the page 600 displays selectable override options 630, 632, and 634, respectively, that when selected allow the user to override the conditional probabilities P(Le|Vc), P(Le|Av), and P(Le|Au), respectively. The user inputs and saves a new minimum value and/or a new maximum value and, optionally, an expected value for the probability distribution. Then, the AVRS 200 may recalculate and display the AVRS score 100. If all of the inputs to a potential vulnerability are overridden, the AVRS 200 may flag the potential vulnerability on the backend for an analyst to review.

The page 600 may display selectable options 640, 642, and 644 that allow an expert to specify the conditional probabilities P(Le|Vc), P(Le|Av), and P(Le|Au), respectively, or values that the AVRS 200 (see FIG. 2) uses to calculate these conditional probabilities.

Returning to FIG. 3, instead of or in addition to block 328, the method 300 may include block 330. In block 330, the AFES 222 (see FIG. 2) may instruct the data protection tool 218 (see FIG. 2) to perform an action with respect to the application with the particular potential vulnerability that prevents the application from causing harm to the system 201 if at least one of the AVRS score 100, the confidentially impact 132, the integrity impact 134, and the availability impact 136 exceeds a threshold value. The action may protect data, the application, and/or other systems from the potential vulnerability by, for example, preventing the application from accessing user data, preventing the application from going into production, quarantining the application, and the like. As mentioned above, different threshold values may be used to determine when the action should be taken depending upon various factors, such as sensitivity of the data handled by the application, customer requirements, and the like.

Then, the method 300 terminates.

Referring to FIG. 2, the ACS 226 may automatically perform the method 300 (see FIG. 3) to automatically update the AVRS score 100 (see FIG. 1) assigned to one or more of the potential vulnerabilities when new information is obtained. Further, The ACS 226 may automatically perform the method 300 (see FIG. 3) to automatically update the AVRS score 100 (see FIG. 1) assigned to one or more of the potential vulnerabilities occasionally or periodically (e.g., every quarter). This allows the AVRS score 100 to change frequently while also allowing new information and attacks to be included in the updated AVRS score. Data used to update an estimate may include, for example, incident data, penetration test findings, and program data from the vulnerability classifier 212. The AVRS 200 may be configured to send messages regarding any changes to the AVRS score 100 obtained for a particular potential vulnerability to any user associated with the particular potential vulnerability.

The ACS 226 may perform the method 300 (see FIG. 3) for more than a single potential vulnerability and/or the ACS 226 may combine the results obtained for multiple potential vulnerabilities. For example, the ACS 226 may generate the AVRS score 100 for all of the potential vulnerabilities of a particular application. Similarly, the ACS 226 may generate the AVRS score 100 for a particular team or an entire organization. When the AVRS score 100 is determined for multiple potential vulnerabilities, a separate AVRS score may be determined for each potential vulnerability. Then, the separate AVRS scores may be combined (e.g., averaged). Because the AVRS 200 generates probability and expected loss values, rather than ordinal values, the likelihood of different risks (or expected losses) can be combined mathematically. For example, the AVRS 200 may generate a joint probability distribution for multiple potential vulnerabilities.

The following pseudocode implements a portion of the method 300 (see FIG. 3).

```
# Given a potential vulnerability and an application, load available
metadata
vuln_metadata = get_vuln_metadata(vuln_id)
application_metadata = get_application_metadata(app_id)
# Get distributions for each likelihood component
# If expert estimates are overridden, this also loads those overrides.
dLe, dVc, dAu, dAv, dCh, dR, dMe = get_distributions(vuln_metadata)
# Get impact distributions for your application
# If expert estimates are overridden, this also loads those overrides.
dIc, dIi, dIa = get_distributions(application_metadata, vuln_metadata
[Vc])
dCc = get_compensating_controls(application_metadata)
# Run Montecarlo simulation and store resulting losses
expected_losses = [ ]
For i from 0 to 10000:
    PLe = sample(dLe) # Get a sample from the given distribution
    PVc = sample(dVc)
    PAu = sample(dAu)
    PAv = sample(dAv)
    PCh = sample(dCh)
    R = sample(dR)
    Me = sample(dMe)
    # Calculate the resulting conditional probability using the
    # Log Odds Ratio method
    #
    P = get_conditional_probability(PLe, PVc, PAu, PAv, PCh)
    # Attenuate the likelihood based on Reliability & Mitigation efficacy
    Patt = P * R * (1 - Me)
    # Does the event occur in this trial, given the calculated likelihood?
    if rand( ) < Patt:
        # Calculate the impacts by sampling those distributions
        Ic = sample(dIc)
        Ii = sample(dIi)
        Ia = sample(DIa)
        # Attenuate impact based on compensating controls
        Ccs_samples = [sample(dCc) for dCc in dCcs]
        total_attentuation = get_conditional_probability(*Ccs_samples)
        Icatt = Ic * total_attenuation[C]
        Iiatt = Ii * total_attenuation[I]
        Iaatt = Ia * total_attenuation[A]
        expected_losses.append([Icatt, Iiatt, Iaatt])
# Calculate the TP90 expected loss
tp90_expected_losses = get_tp90s(expected_losses)
# Store the TP90 and resulting expected losses
store(vuln_id, tp90_expected_losses, expected_losses)
```

Referring to FIG. 1, both the amount of data 140 potentially impacted and the criticality 142 of the data handled by the application are both measured in terms of a number of records. If the application handles multiple data types, which is typical, the amount of data 140 and the criticality 142 are collected for each data type. By way of a non-limiting example, data types may include in order from highest sensitivity to lowest sensitivity: (1) Critical, (2) Restricted, (3) Highly Confidential ("HC"), (4) Confidential, and (5) Public. If this information is not available, the AVRS 200 (see FIG. 2) assumes the application stores Critical information or records for all users of the application.

FIGS. 7-9 illustrate example user interfaces (e.g., windows or screens) that may be used to enter some of the vulnerability properties 102 (see FIG. 1) and/or some of the application properties 104 (see FIG. 1). FIG. 7 illustrates an example page 700 of the user interface 220 (see FIG. 2) that may be used to enter some of the application properties 104 (see FIG. 1). The page 700 includes user inputs 702, 704, 706, and 708 each illustrated as being a dropdown box. The user inputs 702, 704, 706, and 708 are used to enter a number of critical and restricted records, a number of HC records, a number of confidential records, and a number of public records, respectively, potentially impacted by the application, which in this example is an application named "Application (1.0)." Each of the user inputs 702, 704, 706, and 708 presents a set of ranges that the user can use to select the amount of data 140 (see FIG. 1). Alternatively, the user may directly input the amount of data 140.

FIG. 8 illustrates an example page 800 of the user interface 220 (see FIG. 2) that may be used to enter some of the vulnerability properties 102 (see FIG. 1) and some of the application properties 104 (see FIG. 1). The page 800 includes user inputs 802, 804, 806, and 808 that are substantially identical to the user inputs 702, 704, 706, and 708 (see FIG. 7), respectively. The page 800 also includes user inputs 812, 814, 816, and 818 each illustrated as being a dropdown box. The user inputs 812, 814, 816, and 818 are used to enter compensating controls available for critical and restricted records, HC records, confidential records, and public records, respectively. The page 800 also includes user inputs 820 and 822 each illustrated as being a dropdown box. The user inputs 820 and 822 are used to enter the values of the number of systems potentially impacted 162 (see FIG. 1) and the compensating control(s) 144 available to the application.

Initial values of the user inputs 802, 804, 806, 808, 812, 814, 816, 818, 820, and 822 may be supplied automatically for a newly identified potential vulnerability from application metadata (e.g., stored in the optional database(s) 214, the metadata store 232, and the like). However, a user may use any of the user inputs 802, 804, 806, 808, 812, 814, 816, 818, 820, and 822 to manually override these initial values. As mentioned above, if a particular initial value is frequently overridden, the AVRS 200 may recommend that the metadata be updated.

Regarding the vulnerability properties 102 (see FIG. 1), the page 800 includes user inputs 832, 834, 836, and 838 each illustrated as being a dropdown box. The user inputs 832, 834, 836, and 838 may be used to enter values for the access vector 122, the required privilege 121, the mitigation efficacy 125, and the reliability metric 123, respectively.

The page 800 includes an indicator 840 displaying the value of the vulnerability class 120 (see FIG. 1). This value may have been supplied automatically by the vulnerability classifier 212 (see FIG. 2). The page 800 may include an override option 842 that when selected allows the user to override the value for the vulnerability class 120 for this potential vulnerability.

FIG. 9 illustrates an example page 900 of the user interface 220 (see FIG. 2) that may be used to enter multiple vulnerability classes for a particular potential vulnerability. In the example illustrated, the user has identified first and second vulnerability classes 940 and 942. The page 900 also includes a class selection option 944 that when selected allows the user to add another vulnerability class for this potential vulnerability.

Whenever an insufficient number of values of the vulnerability properties 102 (see FIG. 1) and/or an insufficient number of values of the application properties 104 are available to calculate the AVRS score 100, which can occur when the metadata is collected by automated scanners, the AVRS score 100 may be calculated for the potential vulnerability using the information that is available. For instance, every potential vulnerability should have a value for the vulnerability class 120, like CWE-79 XSS, that the ACS 226 can use to determine a partial AVRS score. Further, as explained above, new values can be added to the vulnerability properties 102 and/or the application properties 104 and the AVRS score 100 recalculated.

As explained above, the likelihood 110 is determined based on probability distributions and the impact 112 is determined based on impact distributions. The AVRS 200 provides users with the capability of overriding one or both of these distributions when the users have more data about a situation. Changes to the inputs require periodic auditing to determine if the AVRS 200 is being gamed by users and to see if there is enough consistent user input to indicate that one or more underlying assumptions should be re-evaluated.

As one skilled in the art will appreciate in light of this disclosure, certain embodiments may be capable of achieving certain advantages, including some or all of the following:

(1) the AVRS 200 focuses on scoring a "potential vulnerability," instead of scoring a "risk," which allows user to provide more accurate and less subjective information;

(2) AVRS 200 takes the context of the potential vulnerability within an application and/or system into account;

(3) the AVRS 200 uses existing data and/or expert estimates to form distributions about likelihood and impact, instead of relying on subject ratings provided by users;

(4) the AVRS 200 enables periodic system-wide risk updates based on new information, which is not available in currently available risk rating systems;

(5) the AVRS 200 enables application-level aggregation of vulnerability data that is critical for teams and organizations to make investments in security;

(6) the AVRS 200 may be configured to provide an automated data-driven means of determining which applications and which teams need more prioritization;

(7) the AVRS 200 incorporates data about chained potential vulnerabilities, which means the AVRS 200 incorporates the likelihood that other defects exist that an attacker could chain to cause a loss. This enables the AVRS 200 to score potential vulnerabilities that do not have a known immediate access vector. It has been shown from past penetration tests that two or more low-to-moderate potential vulnerabilities can be chained to cause a loss event that either potential vulnerability in isolation would not.

Figure 10:
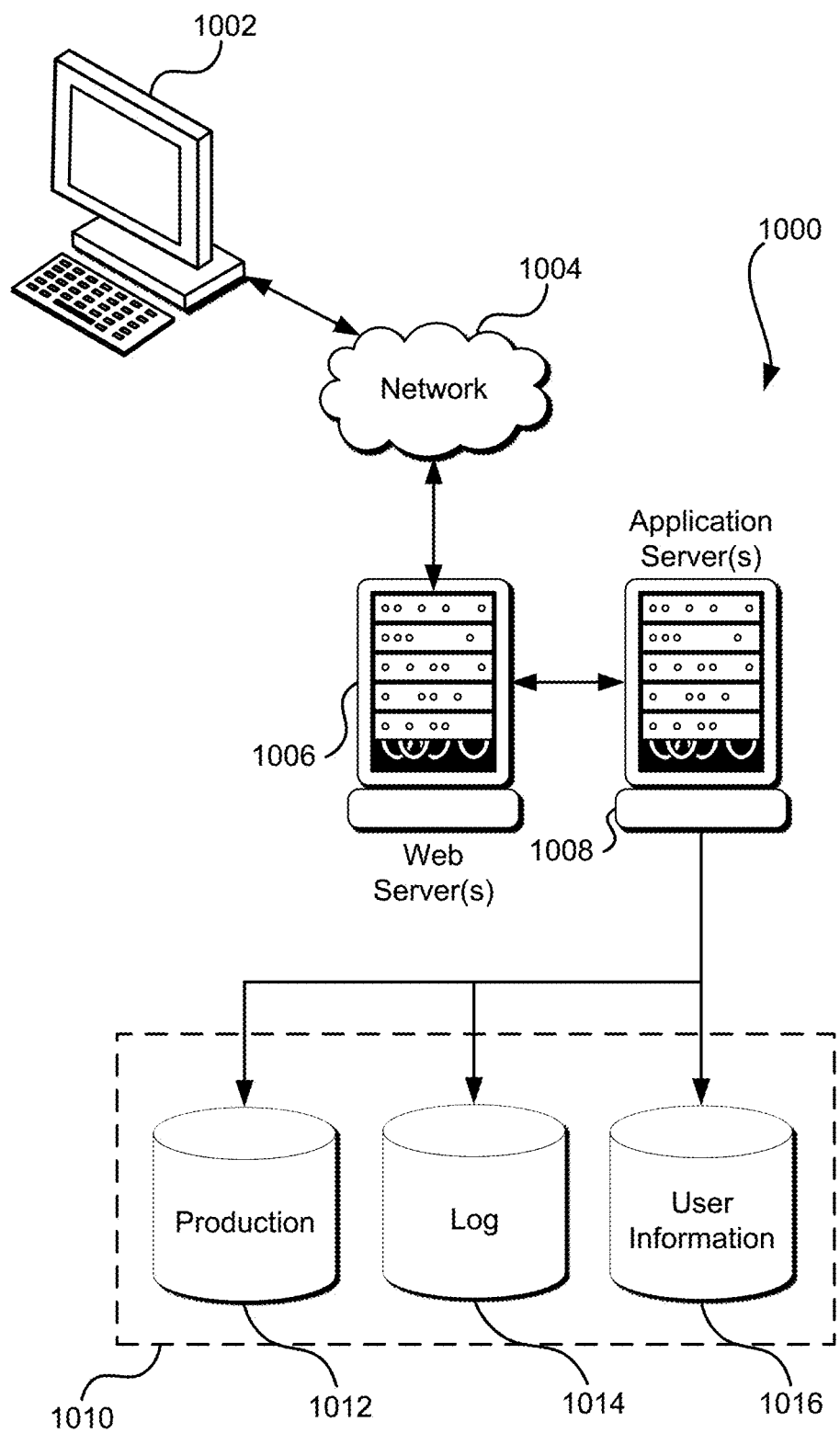
FIG. 10 illustrates a system in which various embodiments of the AVRS system can be implemented in accordance with an embodiment.

FIG. 10 illustrates aspects of an example system 1000 for implementing aspects in accordance with an embodiment of the system 201 (see FIG. 2). As will be appreciated, although a web-based system is used for purposes of explanation, different systems may be used, as appropriate, to implement various embodiments of the system 201 (see FIG. 2). In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. The client device 1002 may be operated by the reporter 202, the reviewer 204, and/or the administrator 206.

In an embodiment, the network 1004 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 1004 is enabled by wired and/or wireless connections and combinations thereof. In an embodiment, the network 1004 includes the Internet and/or other publicly addressable communications network, as the system includes at least one web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application. Referring to FIG. 2, the application server 1008 (see FIG. 10) and/or the data store 1010 may at least partially implement the existing security application(s) 210, the vulnerability classifier 212, the optional database(s) 214, the optional security tool(s) 216, the data protection tool 218, the user interface 220, the AFES 222, the ACDN 224, the ACS 226, the estimate database 228, the estimate tool 230, the metadata store 232, and/or the analysis tool 234. Further, one or more of these components of the system 201 may be implemented by a remote computing device that is connected to the other components by the network 1004.

In an embodiment, the application server 1008 provides access control services in cooperation with the data store 1010 and generates content including but not limited to text, graphics, audio, video and/or other content that is provided to a user associated with the client device 1002 by the web server 1006 in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1002 and the application server 1008, in an embodiment, is handled by the web server 1006 using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store 1010 accesses the user information to verify the identity of the user, accesses the catalog detail information to obtain information about items of that type, and returns the information to the user, such as in a results listing on a web page that the user views via a browser on the client device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Thus, the system 201 (see FIG. 2) may include one or more processors and memory that stores computer-executable instructions that are executable by the one or more processors to cause the system to perform a number of actions. Referring to FIG. 1, these actions include performing a plurality of simulations for a potential vulnerability identified in a software application with loss events having occurred in at least some of the plurality of simulations based on a set of probability distributions associated with values of the vulnerability properties 102 associated with the potential vulnerability. The actions also include determining impact values (e.g., impact 112 and/or the confidentially, integrity, and availability impacts 132, 134, and 136) for the loss events, determining a severity score (e.g., the AVRS score 100) based on the impact values, and generating a graphical user interface (e.g., the page 400 illustrated in FIG. 4) based on the severity score. The severity score indicates a level of potential risk associated with the potential vulnerability.

Further, the system 201 may include a non-transitory computer-readable storage medium storing thereon executable instructions that, as a result of being executed by one or more processors of a computer system, cause the computer system to at least perform a set of actions that include performing a plurality of simulations for a potential vulnerability identified in a software application with a loss event occurring in a portion of the plurality of simulations based at least in part on a set of probability distributions selected using values of the vulnerability properties 102 associated with the potential vulnerability. The actions also include determining a plurality of impact metrics (e.g., impact 112) for the portion of the simulations, determining, based on the plurality of impact metrics, a level of potential risk (e.g., the AVRS score 100) associated with the potential vulnerability, and providing a graphical user interface (e.g., the page 400 illustrated in FIG. 4) based on the level of potential risk.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:

selecting, with at least one computing device, a plurality of probability distributions based at least in part on a set of vulnerability values for a set of vulnerability properties, the set of vulnerability values being associated with a potential vulnerability identified in a software application;

selecting, with the at least one computing device, a plurality of impact distributions based at least in part on a set of application values for a set of application properties and a vulnerability class value of the set of vulnerability values, the set of application values being associated with the software application;

generating, with the at least one computing device, a plurality of simulated loss events by repeatedly (a) sampling the plurality of probability distributions to obtain a plurality of sample probability values, (b) calculating a likelihood of experiencing a loss based on the plurality of sample probability values, (c) determining whether the loss is experienced by comparing the likelihood to a random number, (d) obtaining a plurality of impact values based at least in part on sampling the plurality of impact distributions when it is determined the loss is experienced, and (e) storing the plurality of impact values as a different one of the plurality of simulated loss events;

determining, with the at least one computing device, a severity score for the potential vulnerability based on the plurality of simulated loss events; and generating, with the at least one computing device, a graphical user interface displaying the severity score.

2. The computer-implemented method of claim 1, further comprising:

repeating the selection of the plurality of probability distributions, the selection of the plurality of impact distributions, the generation of the plurality of simulated loss events, and the determination of the severity score for a plurality of potential vulnerabilities identified in the software application to obtain a plurality of severity scores for the software application; and combining the plurality of severity scores to obtain an overall severity score for the software application, the graphical user interface displaying the overall severity score as the severity score.

3. The computer-implemented method of claim 1, wherein determining the severity score for the potential vulnerability based on the plurality of simulated loss events comprises:

calculating a plurality of impact metrics for a plurality of impact types from the plurality of simulated loss events; and determining, with the at least one computing device, the severity score based on the plurality of impact metrics.

4. The computer-implemented method of claim 3, further comprising:

automatically preventing, with the at least one computing device, the software application from having access to user data when the severity score or one of the plurality of impact metrics exceeds a threshold value.

5. A system comprising:

one or more processors; and memory that stores computer-executable instructions that are executable by the one or more processors to cause the system to:

perform a plurality of simulations for a potential vulnerability identified in a software application, loss events having occurred in at least some of the plurality of simulations, the plurality of simulations being based on a set of probability distributions associated with values of a plurality of vulnerability properties associated with the potential vulnerability;

determine impact values for the loss events;

determine a severity score based on the impact values, the severity score indicating a level of potential risk associated with the potential vulnerability; and generate a graphical user interface based on the severity score.

6. The system of claim 5, wherein the computer-executable instructions are executable by the one or more processors to cause the system to:

select a plurality of impact distributions based at least in part on a set of application values for a set of application properties and a vulnerability class value of the plurality of vulnerability properties, the set of application values being associated with the software application, the impact values being determined for the loss events at least in part by sampling the plurality of impact distributions.

7. The system of claim 6, wherein the computer-executable instructions are executable by the one or more processors to cause the system to:

automatically collect at least some of the application values from the software application.

8. The system of claim 6, wherein the computer-executable instructions are executable by the one or more processors to cause the system to:

receive user input comprising a minimum value and a maximum value for a selected one of the plurality of impact distributions; and determine the selected impact distribution based at least in part on the user input.

9. The system of claim 5, wherein the computer-executable instructions are executable by the one or more processors to cause the system to:

calculate a plurality of impact metrics for a plurality of impact types from the impact values; and automatically send an instruction to a data protection tool when the severity score or one of the plurality of impact metrics exceeds a threshold value, the instruction instructing the data protection tool to take an action that prevents the software application from causing harm to the system.

10. The system of claim 5, wherein the plurality of simulations determine a particular loss event of the loss events has occurred by:

sampling the set of probability distributions to obtain a plurality of sample probability values, calculating a likelihood of experiencing a loss based on the plurality of sample probability values, and comparing the likelihood to a random number to obtain a comparison result that indicates whether the particular loss event has occurred.

11. The system of claim 5, wherein the computer-executable instructions are executable by the one or more processors to cause the system to:

automatically scan the software application and identify the potential vulnerability and at least some of the values of the plurality of vulnerability properties.

12. The system of claim 5, wherein the computer-executable instructions are executable by the one or more processors to cause the system to:

receive user input comprising a minimum value and a maximum value for a selected probability distribution in the set of probability distributions; and determine the selected probability distribution based at least in part on the user input.

13. A non-transitory computer-readable storage medium storing thereon executable instructions that, as a result of being executed by one or more processors of a computer system, cause the computer system to at least:

perform a plurality of simulations for a potential vulnerability identified in a software application, a loss event occurring in a portion of the plurality of simulations, the plurality of simulations being based at least in part on a set of probability distributions selected using values of a plurality of vulnerability properties associated with the potential vulnerability;

determine a plurality of impact metrics for the portion of the simulations;

determine, based on the plurality of impact metrics, a level of potential risk associated with the potential vulnerability; and provide a graphical user interface based on the level of potential risk.

14. The non-transitory computer-readable storage medium of claim 13, wherein the instructions further comprise instructions that, as a result of being executed by the one or more processors, cause the computer system to:

select a plurality of impact distributions based at least in part on a vulnerability class value of the plurality of vulnerability properties; and sample the plurality of impact distributions during the portion of the simulations to obtain impact samples, the plurality of impact metrics being determined for the portion of the simulations based at least in part on the impact samples.

15. The non-transitory computer-readable storage medium of claim 14, wherein the plurality of impact distributions are selected based at least in part on the vulnerability class value and a set of application values for a set of application properties, the set of application values being associated with the software application.

16. The non-transitory computer-readable storage medium of claim 13, wherein the instructions further comprise instructions that, as a result of being executed by the one or more processors, cause the computer system to:

display a calibrated expert display to at least one calibrated expert for a selected one of the set of probability distributions;

receive expert input from the at least one calibrated expert via the calibrated expert display; and automatically calculate the selected probability distribution based on the expert input.

17. The non-transitory computer-readable storage medium of claim 13, wherein the instructions further comprise instructions that, as a result of being executed by the one or more processors, cause the computer system to:

determine whether the level of potential risk or one of the plurality of impact metrics satisfy protection criteria; and automatically send an instruction to a data protection tool when the protection criteria is satisfied, the instruction instructing the data protection tool to take an action that prevents the software application from causing harm to at least one of a system and data.

18. The non-transitory computer-readable storage medium of claim 13, wherein the instructions further comprise instructions that, as a result of being executed by the one or more processors, cause the computer system to:

scan the software application to automatically identify the potential vulnerability and at least some of the values of the plurality of vulnerability properties; and initiate the performance of the plurality of simulations.

19. The non-transitory computer-readable storage medium of claim 13, wherein the instructions further comprise instructions that, as a result of being executed by the one or more processors, cause the computer system to:

obtain impact values by sampling a plurality of impact distributions during the portion of the simulations, the plurality of impact metrics being determined for the portion of the simulations based at least in part on the impact values; and generate selectable user inputs operable to display the plurality of impact distributions when selected, the selectable user inputs being displayed on the graphical user interface.

20. The non-transitory computer-readable storage medium of claim 13, wherein the instructions further comprise instructions that, as a result of being executed by the one or more processors, cause the computer system to:

calculate a plurality of conditional probabilities for the plurality of simulations based at least in part on the set of probability distributions; and generate a selectable user input operable to display the plurality of conditional probabilities when selected, the selectable user input being displayed on the graphical user interface.

* * * * *